2 Sheets--Sheet 1.
A. L. HOLLEY.
Ingot Molds.
No. 5,318.
Reissued March 11, 1873.
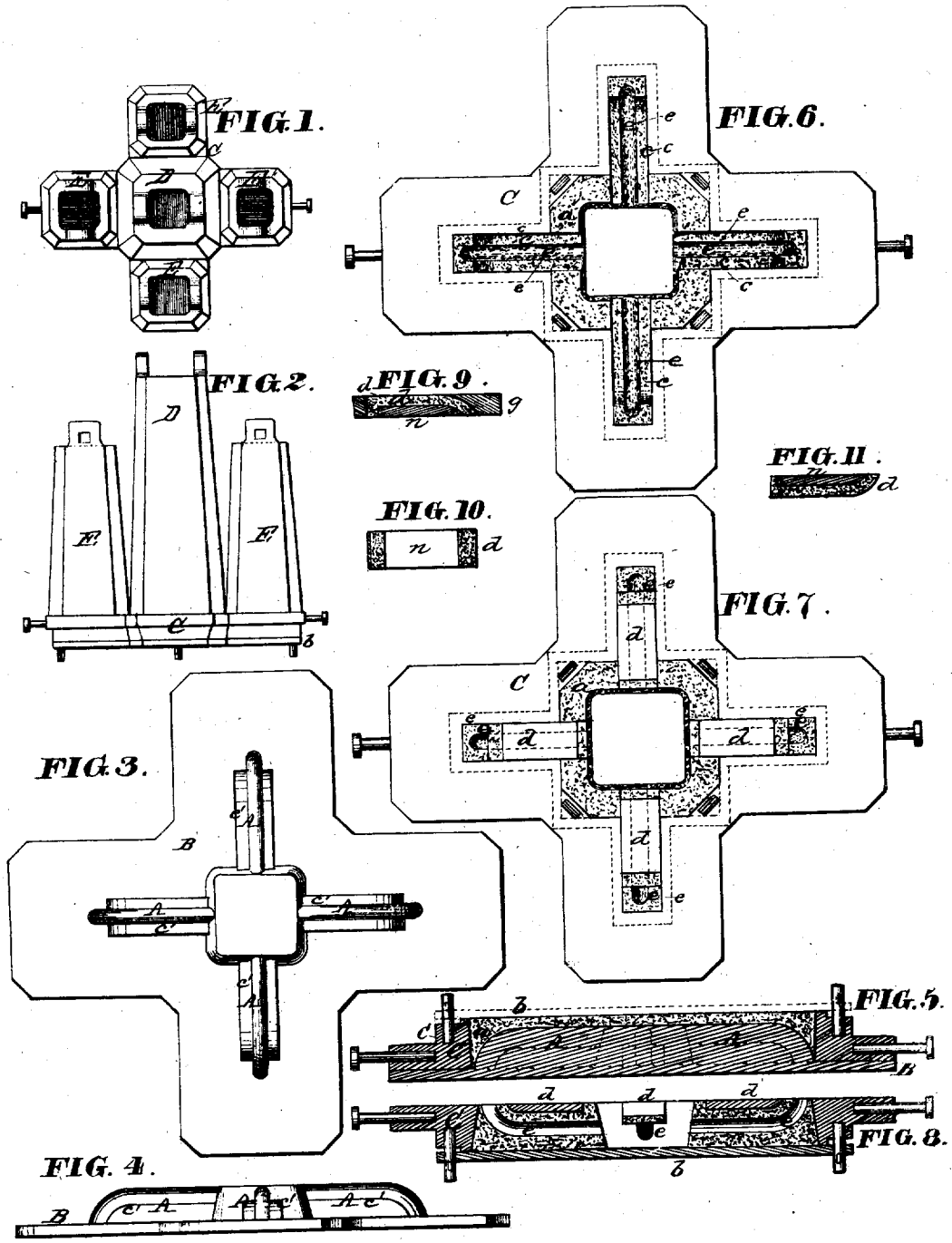
WITNESSES:
Jas. L. Ewin
Walter Allen
INVENTOR:
Alexander Lyman Holley,
By Knight Bros Attorneys.
AM. PHOTO-LITHOGRAPHIC CO. N.Y. (OSBORNE'S PROCESS.)

2 Sheets--Sheet 2.

A. L. HOLLEY.

Ingot Molds.

No. 5,318.

Reissued March 11, 1873.

WITNESSES:-
Jas. L. Ewin
Walter Allen

INVENTOR:
Alexander Lyman Holley
By Knight Bros. Attorneys.

AM. PHOTO-LITHOGRAPHIC CO. N.Y. (OSBORNE'S PROCESS.)

UNITED STATES PATENT OFFICE.

ALEXANDER LYMAN HOLLEY, OF BROOKLYN, NEW YORK.

IMPROVEMENT IN INGOT-MOLDS.

Specification forming part of Letters Patent No. 129,957, dated July 30, 1872; reissue No. 5,318, dated March 11, 1873.

DIVISION B.

*To all whom it may concern:*

Be it known that I, ALEXANDER LYMAN HOLLEY, of the city of Brooklyn, county of Kings, and State of New York, formerly of Harrisburg, Pennsylvania, have invented a certain Improvement in Apparatus for Casting Ingots of Iron and Steel, of which the following is a specification:

*Nature and Objects of the Invention.*

This invention relates to improvements in apparatus for casting ingots or masses of iron or steel.

In previous Letters Patent I have described various methods and apparatus for casting two or more ingots at one pouring by letting the liquid iron or steel run into a sprue-mold, whence it is distributed to the bottoms of surrounding molds by means of runners molded in a flask or distributer, upon which all the molds stand.

My invention, hereinafter described, consists, first, in an improved method of forming the flask or distributer; secondly, in improved means for stopping the tops of the molds filled from the bottom, as hereinafter set forth.

*Description of the Drawing.*

Figure 1 is a plan view, and Fig. 2 a side elevation, of an apparatus for casting ingots, to which this invention is applied. Fig. 3 is a plan view, and Fig. 4 a side or edge view, of a "follow board," with patterns formed thereon to mold the face of the flask or distributer. Fig. 5 is a vertical section illustrating the mode of molding a flask or distributer. Fig. 6 is a plan view of an open flask or distributer as thus molded. Fig. 7 is a plan view, and Fig. 8 a vertical section, of a flask or distributer as completed by the application of runner-cores. Fig. 9 is a vertical section illustrating a preferred mode of molding runner-cores. Fig. 10 is a plan, and Fig. 11 a side view, of a runner-core as thus produced.

*General Description.*

Figure 12:
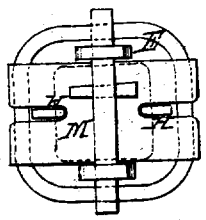
Fig. 12 is a plan view of a closed mold illustrating a mode of stopping the molds at different heights.
Figure 14:
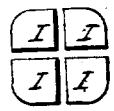
Fig. 14 is a plan view of filling supporting-plates, shown in elevation in Fig. 13.

The first part of my invention consists in an improved method of forming the distributer. Instead of molding the runners by means of separate patterns, as heretofore practiced, I save labor and expense by forming all the patterns A on one follow-board, B, and using and drawing them at one operation. Upon the follow-board B (Figs. 3 and 4) I set a flask, C, bottom upward, as illustrated in Fig. 5. I then ram the space *a* full of sand, clay, or other suitable molding material, and cotter on the bottom plate *b*. I then turn over the flask and remove the follow-board. The flask, as thus molded, is represented in Fig. 6. I then lay cores *d* (one of which is shown in plan in Fig. 10 and in elevation in Fig. 11) into the places *c*, Fig. 6, molded for them, by the projections *c'* of the patterns, Figs. 3 and 4, so as to form the runners, as shown in section at *e*, Fig. 8. Fig. 7 shows the top of the molded flask with the cores *d* in their places ready to receive the ingot-molds. I sometimes make the cores *d* of any suitable molding-material, such as that used for molding the flasks. I prefer to make the top *n* of the core, Figs. 9 to 11, of iron, so as to better resist the pressure of the iron or steel in the runner.

The cores *d* may be molded in any suitable manner. I prefer to mold them by laying the piece of iron *n* into a core-box, *g*, Fig. 9; then ramming in molding material; and then withdrawing the core-box, in the manner commonly practiced in foundries. The cores *d* may be dried before being placed in the flask, or they may be dried with the flask.

In some cases I propose to make the cores wholly of cast-iron. When thus made they should be well coated, by preference, with a thick wash of black lead and fire-clay, to prevent the liquid iron or steel from sticking to the cores. I find that there is a considerable difference in the tendency of liquid iron and steel made from different irons and of different tempers to stick to the iron molds into which it is poured. For the mixtures most liable to stick I prefer to use the core molded from clay, loam, or other suitable molding material. At the same time the iron core can be very cheaply renewed if the liquid iron or steel sticks to it, and its use saves the cost of molding loam or clay cores. The bottom and sides of the runners may be coated with black lead or other suitable blacking before the core is placed in the flask. The joint between the core (whether made of loam or iron) and the molding material in the flask should be filled in any suitable manner, by preference, with a semi-fluid mixture of black lead and fire-clay.

In some cases I prefer to mold in the flask, in any suitable manner, open troughs, runners, or passages, and, instead of covering such runners with cores, as above described, I set the ingot-molds D E upon them in such a way that the bottoms of the molds form the covers of the runners.

I prefer to cover the runners with cores, as above described, when casting liquid iron or steel of a nature or temper that easily cuts and sticks to ingot-molds.

The arrangement of the molds D E on the distributer is illustrated in Figs. 1 and 2. The molds may taper upwardly, as represented, or downwardly, if preferred. The liquid iron or steel is run into the central or sprue mold D and fills the surrounding molds E from the bottom.

Means for stopping the tops of these latter molds to form ingots of different lengths in the same molds, by means of uniform cast-iron stoppers F, is the subject-matter of the second part of my invention, illustrated in Figs. 12 to 15, sheet 2.

E represents an ingot-mold, and F a cast-iron stopper, which may be placed at any required height therein. In order to prevent any fins of iron or steel from running up the side of the mold beyond the stopper and thus cracking the ingot, I fill the mold around and above the stopper, as at L, with sand or loam, by preference, rammed and vented, and held down by a plate, M, wedged down in the usual manner, as illustrated in Fig. 12. To prevent the sand when thrown into the top of the mold from running down past the stopper, either the stopper must be pretty well fitted to the sides of the mold, or the opening around the stopper must be closed when the sand is put in.

Fitting the described form of stopper to the mold would require a different stopper for each different height of ingot on account of the taper of the molds, and would require the insertion of the stopper from beneath, in some cases, which would lead to some delay and inconvenience. I therefore use a stopper small enough to enter the small end of the mold, and I keep the space around the stopper closed while the sand is being put in and rammed. This may be done by employing a supporting-post, K, fitted to the interior of the mold, so that the sand around the stopper would rest upon the top of the post; but as the post is not likely to fit well into different molds, I prefer to set upon it adjustable blocks, I, for the sand to rest upon. The mold is raised and set over the post K, which is beveled at the top. The blocks P P (shown in place in Fig. 8) being then laid on top of the post, slide down the bevels thereof into the corners of the mold, and thus close the mold sufficiently to hold the sand so that it may be rammed. The stopper F is set upon the plates I and the sand L is then put into the mold and rammed, vented, and covered with the plate M. The mold is then lifted from the post and its plates and set upon the flask to receive the iron or steel, as before described. When the liquid iron or steel fills the mold it is chilled by the stopper and by the sand surrounding it so that the ingot can shrink without cracking and so that the mold and stopper can be lifted off from the ingot.

The top of the post K may, if preferred, be made flat and the plates I may be placed in the corners of the mold by hand.

The stoppers may be supported in the molds after the same are removed from the post K by any suitable means.

I have shown certain means for suspending the stoppers.

Figure 13:
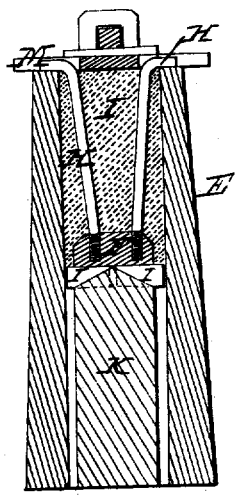
Fig. 13 is a vertical section of the same.

H H, Figs. 12 and 13, represent hooks screwed into the stopper and hanging on the top of the mold.

Hooks of different lengths may be used for ingots of different heights.

Figure 15:
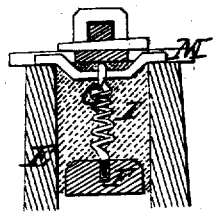
Fig. 15 is a vertical section of the upper part of a finished mold illustrating the employment of a spring to support the stopper.

I sometimes find it useful to suspend the stopper in the ingot-mold by means of a spring, G, suitably applied—for instance, as illustrated in Fig. 15, in order to allow the stopper to come down as the ingot shrinks, should the top of the ingot stick to or become hooked over the stopper.

I do not claim, broadly, herein stopping bottom-filled ingot-molds at different heights, as I have more fully described this in another specification.

*Claims.*

What I claim, and desire to secure by Letters Patent, is—

1. The combination of a flask or distributer composed partly of loam or its equivalent and partly of iron with runners formed in the loam and cores to cover the runners, substantially as and for the purposes herein set forth.

2. A suspended cast-iron stopper for bottom-filled ingot-molds, substantially as herein described.

3. The suspending spring G, in combination with an ingot-mold, E, and a stopper, F, substantially as herein described, for the purpose set forth.

4. The adjustable corner-plates I, in combination with a stopper-supporting post, K, as and for the purpose herein set forth.

5. The supporting-post K with beveled top, in combination with the plates I, for the purpose specified.

A. L. HOLLEY.

Witnesses:
D. BARNES,
GRAM CURTIS.